(12) United States Patent
Thomas et al.

(10) Patent No.: US 10,997,596 B1
(45) Date of Patent: May 4, 2021

(54) SYSTEMS AND METHODS FOR USE IN ANALYZING DECLINED PAYMENT ACCOUNT TRANSACTIONS

(71) Applicant: MASTERCARD INTERNATIONAL INCORPORATED, Purchase, NY (US)

(72) Inventors: Kerry Michael Thomas, Wentzville, MO (US); Monica Marie Mifflin, St. Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 780 days.

(21) Appl. No.: 15/244,505

(22) Filed: Aug. 23, 2016

(51) Int. Cl.
*G06Q 20/40* (2012.01)

(52) U.S. Cl.
CPC ....... *G06Q 20/4016* (2013.01); *G06Q 20/405* (2013.01)

(58) Field of Classification Search
CPC .......................... G06Q 20/4016; G06Q 20/405
USPC ...................................... 705/44, 37
See application file for complete search history.

(56) References Cited

U.S. PATENT DOCUMENTS

| 8,949,150 B2 * | 2/2015 | Siddens | G06Q 20/4016 |
| | | | 235/380 |
| 2009/0106151 A1 * | 4/2009 | Nelsen | G06Q 20/40 |
| | | | 705/44 |
| 2010/0287099 A1 * | 11/2010 | Liu | G06Q 20/40 |
| | | | 705/44 |
| 2011/0022483 A1 * | 1/2011 | Hammad | G06Q 20/12 |
| | | | 705/17 |
| 2012/0158586 A1 * | 6/2012 | Ganti | G06Q 20/10 |
| | | | 705/44 |
| 2013/0024376 A1 * | 1/2013 | Choudhuri | G06Q 40/00 |
| | | | 705/44 |
| 2013/0218758 A1 * | 8/2013 | Koenigsbrueck | G06Q 40/02 |
| | | | 705/39 |
| 2014/0067656 A1 * | 3/2014 | Cohen Ganor | G06Q 50/01 |
| | | | 705/39 |
| 2014/0309862 A1 * | 10/2014 | Ricci | G01C 21/26 |
| | | | 701/36 |
| 2015/0254555 A1 * | 9/2015 | Williams, Jr. | G06N 3/0454 |
| | | | 706/14 |

(Continued)

*Primary Examiner* — Samica L Norman
*Assistant Examiner* — Murali K Dega
(74) *Attorney, Agent, or Firm* — Harness, Dickey & Pierce, P.L.C.

(57) ABSTRACT

Disclosed are exemplary embodiments of systems and methods for analyzing declined payment account transactions. In an exemplary embodiment, a method generally includes accessing, by a computing device, a declined transaction associated with a payment account, and applying, by the computing device, at least one rule to transaction data associated with the payment account and/or transaction data associated with a merchant involved in the declined transaction. The method also includes, based on the at least one applied rule, appending, by the computing device, a fraud accuracy tag to the declined transaction in a data structure, where the fraud accuracy tag is indicative of whether the decline of the transaction is a true positive decline or a false positive decline, whereby the fraud accuracy tag is suitable to provide insight into accuracy of a fraud strategy implemented in connection with the declined transaction.

13 Claims, 3 Drawing Sheets

(56) References Cited

U.S. PATENT DOCUMENTS

| | | | |
|---|---|---|---|
| 2015/0348042 A1* | 12/2015 | Jivraj | G06Q 20/322 |
| | | | 705/44 |
| 2016/0239771 A1* | 8/2016 | Gukal | G06Q 10/0635 |
| 2017/0053458 A1* | 2/2017 | Smith | G07B 15/00 |
| 2017/0140382 A1* | 5/2017 | Chari | G06Q 20/4016 |
| 2018/0315027 A1* | 11/2018 | Kumar | G06Q 20/0655 |

\* cited by examiner

SYSTEMS AND METHODS FOR USE IN ANALYZING DECLINED PAYMENT ACCOUNT TRANSACTIONS

FIELD

The present disclosure generally relates to systems and methods for use in analyzing declined payment account transactions and, in particular, to analyzing payment account transactions that are declined based on one or more fraud strategies, to thereby provide insight into effectiveness of the fraud strategies.

BACKGROUND

This section provides background information related to the present disclosure which is not necessarily prior art.

Payment account transactions are known as a mechanism for consumers to fund purchases of products, such as, for example, goods and services, etc. To initiate the transactions, consumers present payment account credentials, which are used to initiate the payment account transactions through payment networks. As part of the transactions, at the outset or later, the consumers are often authenticated to their payment accounts through signatures, personal identification numbers (PINs), biometrics, or other means. Despite the authentication of the consumers, unauthorized and/or fraudulent transactions are still known to occur.

In connection with payment account transactions, issuers of payment accounts used in the payment account transactions, as well as payment networks, are known to deploy fraud protection services often based on fraud detection models. The fraud detection models leverage fraud reporting as a variable for use in accurately identifying fraudulent activity involving the payment accounts. Transaction data is typically analyzed for fraudulent and non-fraudulent transactions in order to identify patterns, upon which the models are generated. The models, built based on known transaction data, are effective in reducing, and in some instances eliminating, fraudulent transactions and/or certain types of fraudulent activities involving the payment accounts.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment account transactions may be declined (e.g., by issuers, etc.) for a variety of reasons, including, for example, insufficient funds, fraud, etc. When declined for fraud, for example, the decline is often related to one or more fraud indications/strategies (which may be part of, or based on, analysis of the transactions in view of one or more fraud models, rules, etc.). In connection therewith, payment networks are often made aware of the declined transactions and the related fraud-based reason. However, the payment networks may not be informed if the transactions were declined properly or not (i.e., if the fraud-based reason was actually accurate). In many cases, limited, or omitted, reporting of fraud (by issuers or others) reduces the ability of the payment networks, the issuers, and the like to refine and/or gain insight into effectiveness of their fraud strategies, and related fraud models, rules, etc. Uniquely, the systems and methods herein enable analysis of declined payment account transactions, based on transaction data available to a payment network, for example, to identify whether the transactions were declined for fraud (based on various fraud models) and, further, whether the fraud-based declined transaction were properly declined, or not. In particular, a fraud research engine is provided to evaluate transaction data associated with payment accounts to which declined transactions were directed and, based on the evaluation, append one or more fraud accuracy tags to the transactions. The tagged transactions, in turn, may then be used as direct input to fraud models (e.g., fraud models associated with and/or provided by the payment network, etc.), or to calculate fraud detection metrics that can be provided to issuers and/or other entities for offering insight into accuracy of their particular fraud models being employed in declining the tagged transactions.

Figure 1:
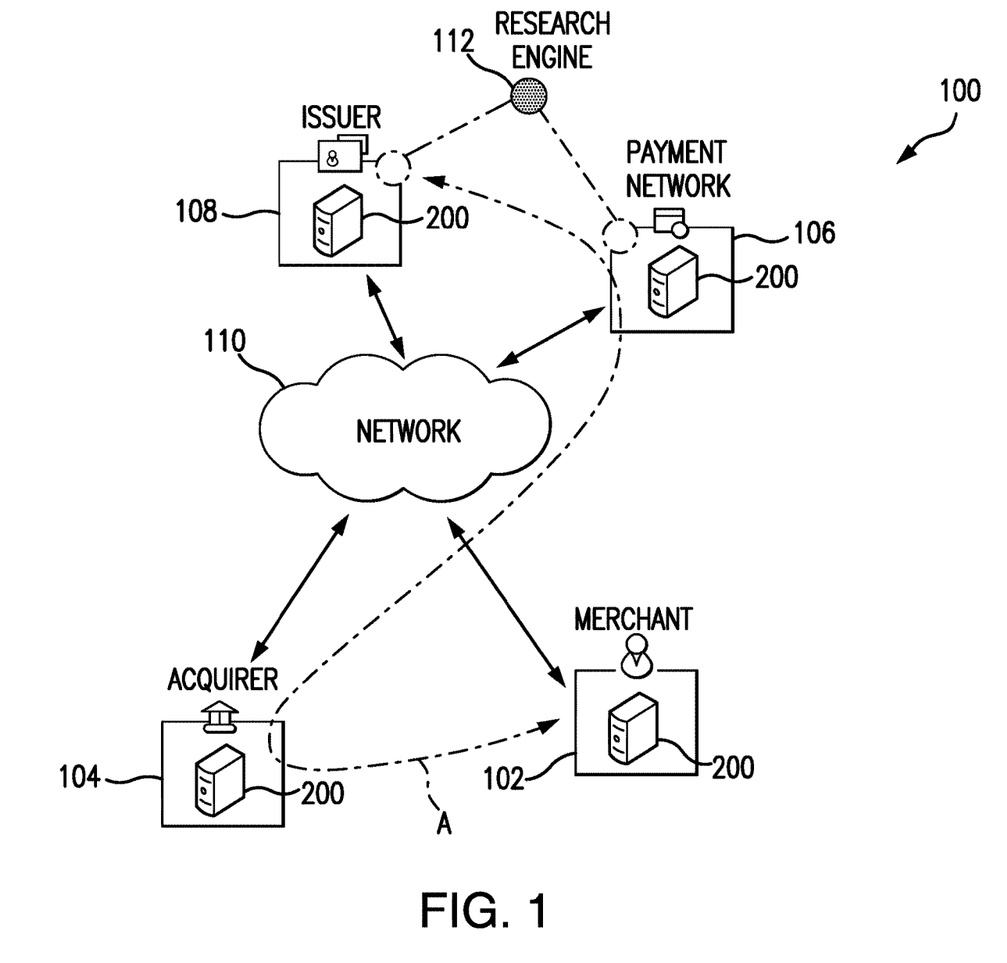
FIG. 1 is a block diagram of an exemplary system of the present disclosure suitable for use in analyzing payment account transactions, which have been declined, to determine if such declines are based on one or more fraud strategies and, in connection therewith, to provide insight into accuracy of the one or more fraud strategies.

FIG. 1 illustrates an exemplary system 100, in which one or more aspects of the present disclosure may be implemented. Although, in the described embodiment, the system 100 is presented in one arrangement, other embodiments may include the system 100 arranged otherwise, depending, for example, on manners in which fraud detection models are employed, particular fraud detection models employed, etc.

Referring to FIG. 1, the system 100 generally includes a merchant 102, an acquirer 104, a payment network 106, and an issuer 108, each coupled to network 110. The network 110 may include, without limitation, a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or any combination thereof. In one example, the network 110 includes multiple networks, where different ones of the multiple networks are accessible to different ones of the illustrated parts in FIG. 1. In this example, the network 110 may include a private payment transaction network made accessible by the payment network 106 to the acquirer 104 and the issuer 108 and, separately, a public network (e.g., the Internet, etc.) through which the merchant 102 and the acquirer 104 may communicate (e.g., via a website or via network-based applications, etc.).

In the system 100, the merchant 102 offers products (e.g., goods and/or services, etc.) for sale to consumers (not shown). The merchant 102 may offer products for sale to consumers at a physical store and/or through a virtual storefront, such as, for example, a merchant website (broadly, a network-based application).

In connection therewith, a consumer may attempt a purchase transaction at the merchant 102, funded by a payment account associated with the consumer. To do so, the consumer presents one or more credentials associated with the payment account (e.g., a primary account number (PAN), a token, etc.) (e.g., by presenting a payment device, etc.) to the merchant 102. In addition to the credentials, the consumer may further be prompted to provide one or more forms of authentication, such as, photo identification, a PIN, etc. The merchant 102, in turn, receives the one or more credentials associated with the consumer's payment account and communicates an authorization request for the payment account transaction (e.g., including the credential(s) and an amount of the purchase, etc.) to the acquirer 104. The authorization request is transmitted along path A in the system 100, as referenced in FIG. 1. The acquirer 104 then communicates the authorization request with the issuer 108, through the payment network 106, such as, for example, through MasterCard®, VISA®, Discover®, American Express®, etc.

Upon receiving the authorization request for the example purchase transaction, the issuer 108 determines whether the payment account is in good standing and whether there are sufficient funds and/or credit to cover the transaction. In addition, the issuer 108 or another entity associated with the issuer 108 (or even an entity associated with the payment network 106, prior to passing the authorization request to the issuer 108) applies one or more fraud strategies (e.g., fraud models or other models, rules, etc.) to the transaction to determine if there is a likelihood that the transaction is fraudulent. The fraud strategies may include fraud models generated by the payment network 106 and provided to the issuer 108, or they may include fraud models directly generated by the issuer 108, or they may include one or more rules applied by the issuer 108, etc. In any case, when the fraud strategies include fraud models, the fraud models may be based on, for example (and without limitation), fraud reported by the consumer (and potentially other consumers) to the issuer 108 (and potentially other issuers), rates of card activity/spend by the consumer (or by other consumers), merchant risk for the merchant 102 (or other merchants), unique transaction attributes, transaction histories of the consumer's payment account and/or other payment accounts, time of day, transaction amount, transaction location, etc. (broadly, fraud indicators/factors). Often, these factors may be employed in the fraud models relative to what may normally be expected for the consumer (e.g., relative to expected transactions, expected transaction times, expected transaction amounts, and/or expected transaction locations for the consumer and/or the consumer's payment account, etc.), or they may be employed independent therefrom.

Then in the example transaction, if the payment account transaction is approved by the issuer 108 (over the fraud model(s) and other rules associated with the issuer 108 and/or the consumer's payment account), an authorization reply (indicating the approval of the transaction) is transmitted back from the issuer 108 to the merchant 102, along path A, thereby permitting the merchant 102 to complete the transaction. The transaction is later cleared and/or settled by and between the merchant 102, the acquirer 104, and the issuer 108. If the transaction is declined, however, for any reason (e.g., insufficient funds, suspicion of fraud in view of the fraud model(s), other reasons, etc.) the authorization reply (indicating a decline of the transaction) is provided back to the merchant 102, along the path A, thereby permitting the merchant 102 to halt or terminate the transaction. The authorization request will typically not include the particular reason for such decline, though. For example, when the transaction is declined for suspicion of fraud, the authorization reply will typically not include any particular indicator representing fraud. Instead, either the payment network 106 or the issuer 108 (depending on which part of the system 100 causes the decline) will have insight (which may still be limited in scope) into the nature of the decline.

Transaction data is generated, collected, and stored as part of the above exemplary interactions among the merchant 102, the acquirer 104, the payment network 106, and the issuer 108. The transaction data includes a plurality of transaction records, one for each transaction (e.g., authorized transactions, cleared and/or settled transactions, attempted transactions, declined transactions, etc.). The transaction records, in this exemplary embodiment, are stored at least by the payment network 106 (e.g., in a data structure associated with the payment network 106, etc.), but could be stored in other parts of the system 100 and transmitted as needed or requested. As used herein, transaction data and/or transaction characteristics may include, for example (and without limitation), primary account numbers (PANs) for accounts involved in the transactions, amounts of the transactions, merchant IDs for merchants involved in the transactions, merchant category codes (MCCs), approve/decline indictors for the transactions, merchant approval rates, dates/times of the transactions, geolocations of the transactions, etc. It should be appreciated that more or less information related to transactions, as part of either authorization, clearing, and/or settling, may be including in transaction records (comprising transaction data) and stored within the system 100, at the merchant 102, the acquirer 104, the payment network 106, and/or the issuer 108.

In various exemplary embodiments, the consumers involved in the different transactions herein are prompted to agree to legal terms associated with their payment accounts, for example, during enrollment in their accounts, etc. In so doing, the consumers may voluntarily agree, for example, to allow merchants, issuers, payment networks, etc., to use data collected during enrollment and/or collected in connection with processing the transactions, subsequently for one or more of the different purposes described herein.

Figure 2:
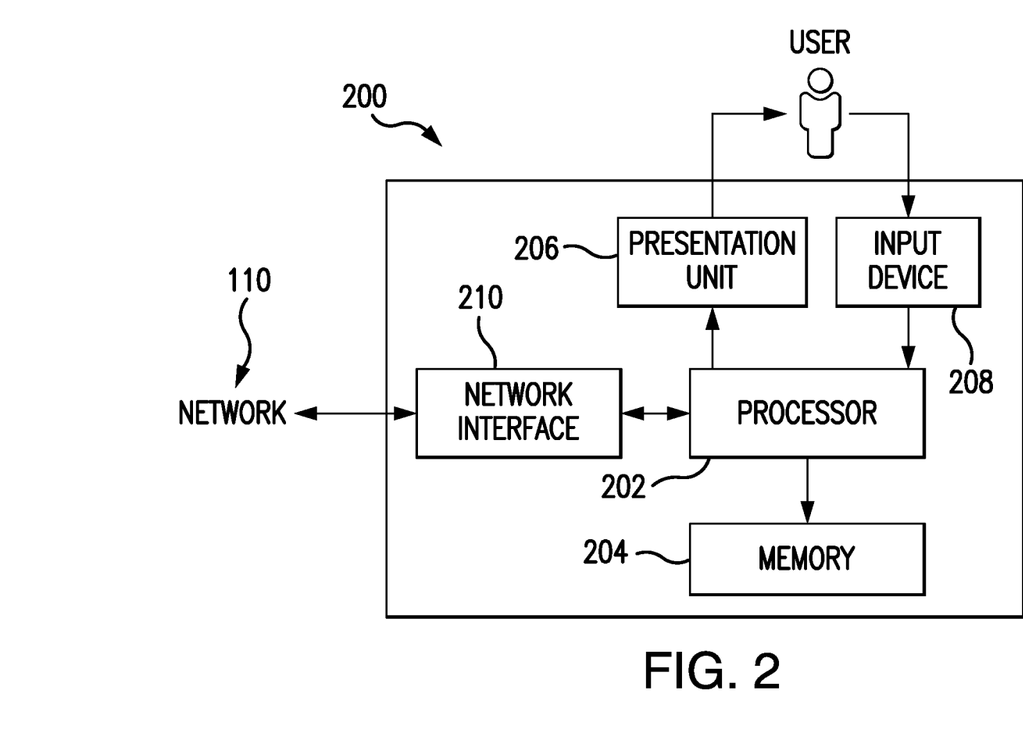
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, routers, personal computers, tablets, laptops, smartphones, PDAs, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the merchant 102, acquirer 104, the payment network 106, and the issuer 108 are illustrated as including, or being implemented in, computing device 200, coupled to the network 110. However, the system 100 should not be considered to be limited to the computing device 200, as described below, as different computing devices and/or arrangements of computing devices may be used. In addition, different components and/or arrangements of components may be used in other computing devices.

The exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the operations described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data/characteristics, fraud accuracy tags, fraud accuracy rules, fraud models, payment account data, and/or other types of data suitable for use as described herein. Furthermore, in various embodiments, computer-executable instructions may be stored in the memory 204 for execution by the processor 202 to cause the processor 202 to perform one or more of the operations described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In the exemplary embodiment, the computing device 200 includes a presentation unit 206 that is coupled to (and is in communication with) the processor 202 (however, it should be appreciated that the computing device 200 could include output devices other than the presentation unit 206, etc.). The presentation unit 206 outputs information, either visually or audibly to a user of the computing device 200 (e.g., fraud detection metrics to a user associated with the issuer 108, fraud detection metrics to a user associated with the payment network 106, etc.). It should be appreciated that various interfaces (e.g., as defined by conventional applications, network-based applications, etc.) may be displayed at computing device 200, and in particular at presentation unit 206, to display such information. The presentation unit 206 may include, without limitation, a liquid crystal display (LCD), a light-emitting diode (LED) display, an LED, an organic LED (OLED) display, an "electronic ink" display, speakers, etc. In some embodiments, presentation unit 206 includes multiple devices.

The computing device 200 also includes an input device 208 that receives inputs from the user (i.e., user inputs) such as, for example, responses to fraud detection metrics and/or modifications to fraud strategies based thereon from a user associated with the issuer 108, from a user associated with the payment network 106, etc. The input device 208 is coupled to (and is in communication with) the processor 202 and may include, for example, a keyboard, a pointing device, a mouse, a button, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

In addition, the illustrated computing device 200 also includes a network interface 210 coupled to (and in communication with) the processor 202 and the memory 204. The network interface 210 may include, without limitation, a wired network adapter, a wireless network adapter (e.g., a Wi-Fi adapter, a NFC adapter, a Bluetooth adapter, etc.), a mobile network adapter, or other device capable of communicating to/with one or more different networks, including the network 110. Further, in some exemplary embodiments, the computing device 200 includes the processor 202 and one or more network interfaces 210 incorporated into or with the processor 202.

Referring again to FIG. 1, the system 100 further includes a research engine 112, which is configured, often by computer-executable instructions, to perform one or more of the operations described herein (e.g., operations relating to fraud labeling decline logic, etc.). As indicated by the dotted lines, the research engine 112 may be a part of and/or implemented in the payment network 106 and/or the issuer 108, for example, in association with the respective computing device 200. However, it should be understood that, in alternative embodiments, the research engine 112 may be implemented in one or more other parts of the system 100 or in other parts of other system embodiments (e.g., in connection with one or more service providers that interact with the payment network 106 and/or the issuer 108 to provide fraud accuracy insights, as described herein, different payment networks, acquirers, issuers, etc.), or the like. Further yet, in some embodiments, the research engine 112 may be implemented as a standalone part of the system 100 (e.g., implemented in a computing device consistent with computing device 200, etc.).

In the illustrated embodiment, the research engine 112 is configured to access (or otherwise retrieve and/or receive) transactions that have been declined by the issuer 108 (and/or by other issuers), based on one or more indications of potential fraud for the transactions (e.g., as identified by the issuer 108 based on one or more fraud models implemented by the issuer 108 and reported to the payment network 106, as identified by the payment network 106, etc.). Additionally, the research engine 112 is configured to access (or otherwise retrieve and/or receive) transaction data associated with payment accounts to which the declined transactions were directed (e.g., via the payment network 106, etc.). In this manner, the research engine 112 has access to multiple declined transactions (regardless of reasons for such declines) and corresponding transaction data for the associated payment accounts for use, at least in part, in analyzing the declined transactions as described more hereinafter.

Then, the research engine 112 is configured to determine, based on the characteristics of the transaction data (associated with the payment accounts to which the declined transactions were directed), if the declined transactions were declined for fraud or not, and if the fraud-based declined transactions were properly declined or improperly declined. In so doing, the research engine 112 is configured to append fraud accuracy tags (or labels) to each of the accessed declined transactions. This may include, for example, identifying the fraud-based declines of the transactions as either true positives (e.g., proper declines, etc.) or false positives (e.g., improper declines, declines of genuine transactions, etc.). The research engine 112 is configured, then, to use the tagged transactions as direct input to various fraud models (e.g., fraud models associated with and/or provided by the payment network 106, etc.), and/or to calculate fraud detection metrics that can be provided to issuers (e.g., the issuer

108, etc.) and/or other entities (e.g., the merchant 102, etc.) for offering insight into the accuracy of the one or more fraud models, or other strategies, used by the issuer 108, for example, to identify the transactions as potentially fraudulent.

In one example application, once the research engine 112 appends fraud accuracy tags to each of the accessed transactions, the tags and/or the tagged transactions are used by the payment network 106, for example, as inputs to a fraud scoring model provided by the payment network 106 to the issuer 108 to enhance performance of the model by identifying false positive fraud declines and true positive fraud declines, and then scoring them with more accuracy through the model to reduce false positives and false negatives in the future. In particular, the fraud model may include a parameter relating to whether or not a transaction is fraudulent. Typically, the model may include two options for the parameter: "0" if the transaction is genuine (i.e., not fraudulent) and "1" if the transaction is fraudulent. Through use of the fraud accuracy tags implemented herein, the model may further include two additional options for the parameter: "2" if the transaction involves to a true positive decline and "3" if the transaction involves a false positive decline. As can be appreciated, such additional granularity relating to the decline of the transaction can provide additional accuracy to the model when applied to future transactions.

In another example application, once the research engine 112 appends fraud accuracy tags to each of the accessed transactions, the tags and/or the tagged transactions are used by the payment network 106 to report performance of various fraud models used in connection with declining the transactions (e.g., to various users of the models such as associated with the payment network 106, the issuer 108, etc.), and to provide the recipients a view into the accuracy of the decline decisions resulting from application of the models (in addition to the overall performance of the models relative to the recipients' current fraud-based decision strategy). In connection with such reporting, the research engine 112 and/or the payment network may calculate various metrics relating to such performance of the various fraud models including, for example, various fraud ratings and/or fraud ratios (as described more hereinafter).

Figure 3:
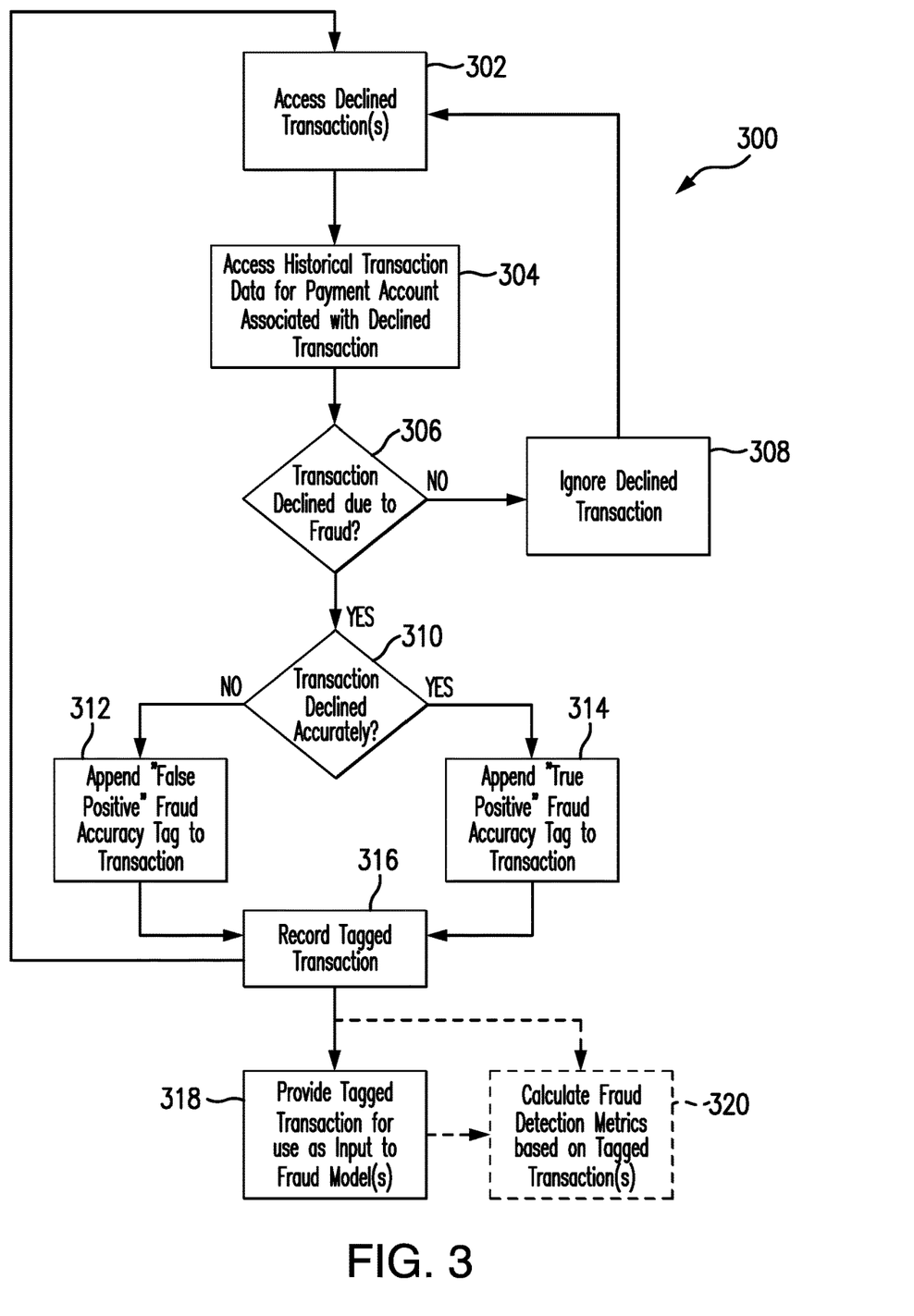
FIG. 3 is an exemplary method, which may be implemented in connection with the system of FIG. 1, for tagging payment account transactions declined based on one or more indications of fraud, to thereby provide insight into accuracy of the one or more fraud indications and associated fraud strategies.

FIG. 3 illustrates exemplary method 300 for identifying payment account transactions that have been declined based on fraud and tagging the declined payment account transactions based on the identified fraud, to provide insight into the accuracy of one or more fraud indications/strategies (e.g., fraud models, etc.) used in declining the transactions as being potentially fraudulent. In the exemplary embodiment, method 300 is described with reference to the system 100 and the computing device 200. It should be appreciated, however, that the methods herein are not limited to system 100 and the computing device 200, and likewise, the systems and computing devices described herein are not limited to method 300.

With reference to FIG. 3, initially in the method 300, the research engine 112 accesses one or multiple transactions, at 302, that have been declined (for any reason). By accessing the declined transactions, the research engine 112 access the transaction data representative of the declined transactions (e.g., via the payment network 106, the issuer 108, etc.). The accessed transactions are historical transactions, as the research engine 112 generally accesses the declined transactions at some time after the transactions are originally declined, for example, by the payment network 106 or the issuer 108 (e.g., the research engine 112 is not operating in real-time or near real-time format in the method 300, but instead is operating offline; etc.). Such transactions may include all declined transactions associated with payment accounts issued by the issuer 108 and/or all declined transactions communicated through the payment network 106, or a portion thereof (e.g., filtered based on date, merchant category, etc.). In at least one embodiment, accessing declined transactions may include detecting declined transactions at or about the time the transactions are declined, in path A of FIG. 1, for example, by the issuer 108 and/or the payment network 106, etc. In particular, when the issuer 108 transmits an authorization reply indicating a decline of a transaction along path A, as described above, the research engine 112 (whether associated with the payment network 106 or the issuer 108) may then access the declined transaction.

The research engine 112 also obtains historical transaction data for the payment accounts to which the declined transactions were directed, at 304, and/or other transaction data (other than historical data). Historical transaction data, as described above, may include transaction amounts, time/date of transactions, locations of transactions, merchants involved in the transactions (e.g., merchant identifiers, merchant approval rates, merchant clearing rates, MCCs, etc.), whether the transactions are card-not-present transactions, prior declined transactions, etc. Transaction data may further include authorization data, debit data, "System to Avoid Fraud Effectively" (SAFE) data and reporting (e.g., reporting by the issuer 108 to the payment network 106 of particular fraudulent activity, etc.), clearing data, etc. related to the payment accounts, merchants involved in the transactions (e.g., the merchant 102, etc.), issuers associated with the payment accounts (e.g., the issuer 108, etc.), etc.

Once the declined transactions, and the historical transaction data for the payment accounts associated with the declined transactions, are accessed, the research engine 112 determines, for each of the declined transactions, whether the declined transaction was declined based on a fraud indication/strategy (e.g., based on a suspicion of fraud, etc.), at 306. This may be determined, for example, through direct input from the issuer 108 based on the issuer's visibility to transactions declined by the various fraud indicators/strategies (e.g., fraud models, etc.) implemented by the issuer 108, verses transactions declined for other reasons, etc. If the research engine 112 determines (at 306) that the declined transaction was declined for a reason other than for a suspicion of fraud (e.g., for insufficient funds, etc.), the research engine 112 ignores the transaction with regard to the method 300, at 308, and/or does not submit the transaction for further analysis herein.

Conversely, if the research engine 112 determines (at 306) that the declined transaction was declined based on a suspicion of fraud (e.g., based on an input of such from the issuer 108, etc.), the research engine 112 then determines, at 310, whether the transaction was correctly declined (e.g., was a true positive) or incorrectly declined (e.g., was a false positive).

Specifically, in this exemplary embodiment, the research engine 112 employs various rules to determine if the transaction was declined for a fraud-based reason (at 306) and to determine if the decline of the transaction (for the fraud-based reason) was a true positive or a false positive (at 310), or broadly, whether the decline was accurate or not. The rules may be applied in conjunction with these two operations (such that operations 306 and 310 are performed substantially at the same time), or separately (such that operation 306 is performed generally first and then operation 310). In either case, in so doing, the research engine 112 may access a rules data structure stored in memory (e.g., memory 204, etc.) of computing device 200, for example, associated with the research engine 112. The rules data structure, then, includes various rules that may be employed by the research engine 112 to determine if a declined transaction was declined based on fraud, and was correct or not.

As an example, the research engine 112 may access 100 declined transactions in connection with implementation of the method 300. As described, however, the research engine 112 does not initially know why the transactions were declined (it only knows that they have been declined). The research engine then applies various rules to the transactions to determine if they were declined based on fraud, and if such fraud-based declines were accurate. In connection therewith, the research engine 112 may identify ten of the declined transactions as being declined based on fraud, and the decline being true positive (e.g., a correct fraud-based decline, etc.). And, the research engine 112 may identify twenty of the declined transactions as being declined based on fraud, and the decline being a false negative (e.g., an incorrect fraud-based decline, etc.).

With that said, Table 1 illustrates various exemplary rule execution categories, each comprising one or more rules that may be employed by the research engine 112 to determine if a declined transaction was fraud-based or not, and was correct or not. As shown, the various categories of rules generally provide a condition of the transaction, and/or a condition of the historical transaction data associated with the payment account to which the declined transaction was directed, and also a fraud accuracy tag (e.g., a "True Positive" tag, a "False Positive" tag, etc.). More particularly, each rule included within a given one of the categories generally provides a condition of the transaction, and/or a condition of the historical transaction data associated with the payment account to which the declined transaction was directed, and also a fraud accuracy tag indicating whether the decline of the transaction at issue was a true positive decline or a false positive decline.

TABLE 1

Potential Fraud

| Rule Execution Categories | Accuracy Tag(s) |
|---|---|
| Category 1: Suspicious activity patterns following a decline (e.g., payment card is declined with no subsequent approval activity, etc.). | True Positive/ False Positive |
| Category 2: Similar or associated transaction decline activity within a given timeframe of an issuer reported fraud transaction (e.g., payment card is declined within 48 hours of a SAFE reported fraud transaction at same merchant, etc.). | True Positive/ False Positive |
| Category 3: Highly suspicious or unusual behavior at merchant (e.g., payment card is declined at merchant with zero percent clearing rate, etc.). | True Positive |
| Category 4: Card is declined by payment network decision management platform. | True Positive |
| Category 5: Out of footprint Cardholder activity (e.g., payment card is declined and distance between declined transaction and previous transaction is unreasonable, etc.). | True Positive/ False Positive |
| Category 6: No history associated with transaction and no fraud reported on similar transactions. | False Positive |
| Category 7: Excessive declines in common fraud reason codes. | True Positive/ False Positive |
| Category 8: Unusual or suspicious individual transaction decline (e.g., payment card is declined and the transaction amount is at least ten times greater than average approval amount over last month, etc.). | True Positive/ False Positive |
| Category 9: Declines associated with known test/probe merchant. | True Positive |

As shown, for several of the categories of rules, application of some rules in the category to a declined transaction may result in a true positive tag while other rules in the same category may result in a false positive tag. For example, Category 1 may include one rule specifying that, for a declined transaction, if a payment card is declined and there is no subsequent approval history for the payment card, the decline of the underlying transaction is a true positive fraud decline; and another rule specifying that, for a declined transaction, if a payment card is declined and there is no additional activity for the payment card in a subsequent time interval, the decline of the underlying transaction is a false positive fraud decline.

It should be appreciated that the categories of rules included in Table 1 are illustrative only (and are not limiting in nature), and that additional, different, and/or other categories of rules may be applied (each with desired rules), by the research engine 112 (at 310 in the method 300), to determine if the transaction was declined correctly as a true positive or incorrectly as a false positive. In connection therewith, it should also be appreciated that such categories of rules (and the rules associated therewith) may change/evolve over time depending on results of the fraud labeling decline logic applied herein (by the research engine 112) and other input regarding fraudulent transactions, etc. As such, it should again be appreciated that any listing of rule categories and/or rules used by the research engine 112 is not limited in scope, and is in fact generally fluid in nature.

Further, the research engine 112 may limit use of some or all rules, in the categories of rules in Table 1, or other rules. For example, certain rules may only be applied to transactions for payment accounts that have at least one approved transaction in history; certain rules may only be applied to transactions that are declined within 48 hours of the last approved transaction; certain rules may only be applied to particular response codes (e.g., codes 01, 05, 62, 57, etc. as included in the authorization reply (for a transaction) by the issuer 108 and collected by the payment network 106); certain rules may only apply to EMV/CHIP transactions involving EMV-type fraud; etc.

With continued reference to FIG. 3, based on the determination at 310, the research engine 112 appends an appropriate fraud accuracy tag to the transaction. Specifically in the method 300, if the research engine 112 determines that the transaction was incorrectly declined based on fraud, the research engine 112 appends a "false positive" tag to the transaction, at 312. Alternatively, if the research engine 112 determines that the transaction was correctly declined based on fraud, the research engine 112 appends a "true positive" tag to the transaction, at 314. The appended fraud accuracy tags may take the form of strings, number values, Boolean values, or the like. For instance, the fraud accuracy tag may be a string in the form of "true" or "false", or the fraud accuracy tag may be a simple Boolean value of true or false. The fraud accuracy tags are appended to the transaction, such that they remain associated with the transaction (and the corresponding transaction data for the transaction) and may be accessed when an entity has access to the transaction (and its transaction data). For instance, the transaction may be represented in a data structure (e.g., at the payment network 106, the issuer 108, etc., as described above) that, following operations 312 and 314, contains the fraud accuracy tag and that includes an interface enabling the contained fraud accuracy tag to be accessed.

It should be appreciated that the research engine 112 may analyze the declined transaction only once, whereby only one tag is applied, or may analyze the declined transaction more than once, at more than one different time, where results of the above rules may change. As such, in subsequent use of the rules in Table 1, the research engine 112 may append a different tag to the declined transaction, over a prior tag. For example, a "false positive" tag may be overridden with a "true positive" tag in the event that the declined transaction is associated with a known/reported fraud case in a SAFE system or the like.

It should also be appreciated that, in the illustrated method 300, the transactions accessed by the research engine 112 (at 302) are historical transactions that have already taken place and, potentially, already been declined. As such, in the illustrated embodiment, the research engine 112 is appending the tags to the transactions offline and, as described above, uses the recorded data to influence model development and model enhancement to more accurately score transaction risk. However, in some exemplary embodiments, it is contemplated that such operations may potentially take place in a real-time or near real-time format.

Next in the method 300, the tagged transaction is recorded, or stored, by the research engine 112, at 316, in a tagged transaction data structure containing the transaction data for the declined transaction, or into a different data structure associated with the same or different transaction data. In particular, the tagged transaction may be recorded in the tagged transaction data structure with a plurality of other tagged transactions for future access and/or use by the research engine 112 or by other entities with which the research engine is associated (e.g., the payment network 106, the issuer 108, etc.). The tagged transaction data structure may be integrated with and/or accessible by the research engine 112, and/or may be generally accessible by the other entities. After the tagged transaction is recorded, in embodiments where there are other declined transactions available to the research engine 112, the research engine 112 may return to the beginning of the method 300 to access the next declined transaction, at 302.

In the above example having 100 declined transactions, the research engine 112 may tag the ten correctly declined transactions with a true positive tag (at 314) and store the tagged transactions in the tagged transaction data structure (e.g., in association with the issuer 108, the model used to decline the transactions, etc.). Similarly, the research engine 112 may tag the twenty incorrectly declined transactions with a false positive tag (at 312) and store the tagged transactions in the tagged transaction data structure (e.g., in association with the issuer 108, the model used to decline the transactions, etc.).

Then, at 318, the research engine 112 provides (or otherwise outputs) the tagged transactions (and associated fraud accuracy tags) as an additional input to a fraud scoring model, for example, provided by the payment network 106 to the issuer 108, etc. Through additional input of the tagged transactions, performance of the model can be improved/enhanced such that future use of the model in scoring transaction may be more accurate (thereby potentially reducing false positive declines and false negative declines (e.g., fraudulent transactions not identified, or missed, by the fraud scoring model, etc.). In turn, taking into account the additional input of the tagged transaction (e.g., the appended fraud accuracy tag, etc.), the research engine 112 facilitates calculation of a fraud score, based on the model (either via direct calculation of the score, or via the payment network 106, issuer 108, etc.).

In various exemplary embodiments, the research engine 112 may also, optionally (as indicated by the dotted lines in FIG. 3), use the tagged transaction (potentially in combination with multiple other tagged transactions in the tagged transaction data structure) to calculate one or more fraud detection metrics, at 320. Fraud detection metrics, such as, for example, fraud ratings and/or fraud ratios, may be used to recognize statistics and/or performance aspects of fraud detection models used by the payment network 106 and/or the issuer 108 to identify potentially fraudulent transactions (such as the ones identified at 306 and 310). For instance, the research engine 112 may calculate metrics such as a client impact ratio (a ratio of false positive fraud declines against true positive fraud declines (e.g., 2.0 in the above example involving the 100 declined transactions, etc.)), a decision effectiveness rating (a rating based on the ratio of true positive fraud declines to total fraud declines (e.g., 0.1 in the above example involving the 100 declined transactions, etc.)), a decline fraud rate (a percentage of fraud identified and declined for a given scoreband associated with a given scoring model making use of the tags appended herein (e.g., a scoreband, or range of scores, from 1-10 or from 950-999, etc., for a given scoring model that delivers score values ranging from 1-999; etc.)), a monetary impact rate (a rate evaluating the average loss/payment account in the event of a false positive), an impact recovery rate (a rate measuring the duration of reduced spending on a payment account subsequent to a false positive fraud decline averaged across all payment accounts with a false positive fraud decline), a false positive rate (e.g., 0.2 in the above example involving the 100 declined transactions, etc.), a fraud detection rate, a fraud review rate, a first fraud rate, detection delay metrics, a Gini coefficient, other metrics used in other risk models, etc. It should be understood that such metrics may take the form of raw results of the calculations (e.g., numeric values, percentages, etc.) and/or ratings, levels, or the like with defined thresholds and/or scales (e.g., "High" and "Low" thresholds, ratings from 1-10, etc.).

Further, the research engine 112 may also (at 320) provide the tagged transaction and/or fraud detection metrics to other parts of the system 100, shown or not (e.g., the issuer 108, etc.). The tagged transaction and/or fraud detection metrics may, then, be used by the issuer 108, for example, to alter, enhance, or improve fraud detection methods, models, and/or rules (broadly, fraud indications) implemented in the system 100 to identify fraudulent transactions. In connection therewith, the research engine 112 may provide a decision score to the issuer 108, for example (based on the calculated metrics (at 318)), for use in setting alert thresholds and rules. Further, the research engine 112 may provide a reporting of the metrics to the issuer 108, thereby providing insights based on the outcome of the appended tags which may be leveraged to enhance issuer risk strategies.

In view of the above, the systems and methods herein provide for analysis of declined payment account transactions, thereby permitting review of fraud indications/strategies (e.g., fraud model(s), etc.) used to decline particular ones of the transactions (when based on fraud) for accuracy. In particular, historical transaction data is used to determine if a declined transaction was actually fraudulent or not, and as a basis to tag the declined transaction for accuracy (e.g., as a true positive fraud, as a false positive fraud, etc.). Tags for multiple declined transactions may then be compiled, analyzed and/or reviewed, for certain issuers and/or for particular fraud models, for example, to provide metrics related to the same. In this manner, by evaluating the tags, accuracy of the underlying fraud strategies (used to evaluate the historical transactions) can be determined and modified as appropriate (e.g., deleted, improved, changed and/or adjusted (broadly, altered), etc.) to improve decline of fraudulent transactions in the future, and reduce incidents of declined non-fraudulent transactions.

It should be appreciated that the functions described herein, in some embodiments, may be described in computer executable instructions stored on a computer readable media, and executable by one or more processors. The computer readable media is a non-transitory computer readable media. By way of example, and not limitation, such computer-readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by: (a) accessing a declined transaction associated with a payment account; (b) applying at least one rule to transaction data associated with the payment account and/or transaction data associated with a merchant involved in the declined transaction; (c) based on the at least one applied rule, appending a fraud accuracy tag to the declined transaction in a data structure, the fraud accuracy tag indicative of whether the decline of the transaction is a true positive decline or a false positive decline, whereby the fraud accuracy tag is suitable to provide insight into accuracy of a fraud strategy applied in connection with the declined transaction; and (d) outputting the fraud accuracy tag to a computing device associated with a fraud model, whereby the computing device associated with the fraud model is able to use the fraud accuracy tag as an input to update the fraud model.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, using a research engine computing device to employ data associated with declined transactions as a basis to append fraud accuracy tags to the declined transactions, the method comprising:

for each of multiple declined transactions:
retrieving, by the research engine computing device integrated with at least one of a payment network and an issuer, data indicative of a declined transaction directed to a payment account associated with the issuer, offline after the transaction was declined;
accessing historical transaction data for the payment account beyond the declined transaction;
retrieving, from a rules data structure in memory of the research engine computing device, by the research engine computing device, multiple rules indicative of false positive declines and/or true positive declines;
calculating, by the research engine computing device, based on the multiple rules and said historical transaction data for the payment account, whether the declined transaction is a true positive decline or a false positive decline; and
appending, by the research engine computing device, a fraud accuracy tag to the declined transaction in a data structure associated with at least one of the payment network and the issuer, the fraud accuracy tag indicative of whether the declined transaction is a true positive decline or a false positive decline, whereby the fraud accuracy tag provides insight into accuracy of a fraud strategy applied in connection with the declined transaction;

calculating, by the research engine computing device, at least one fraud detection metric based on the fraud accuracy tags for the multiple declined transactions, the at least one fraud detection metric indicative of overall performance of the fraud strategy; and transmitting, by the research engine computing device, a reporting of the at least one fraud detection metric to the issuer of the payment account, thereby permitting the issuer to evaluate accuracy of the fraud strategy.

2. The computer-implemented method of claim 1, further comprising outputting the fraud accuracy tag to a computing device associated with a fraud model, whereby the computing device associated with the fraud model uses the fraud accuracy tag as an input to update the fraud model.

3. The computer-implemented method of claim 1, wherein the at least one fraud detection metric includes a ratio of false positive fraud declines to true positive fraud declines.

4. The computer-implemented method of claim 1, wherein calculating whether the declined transaction is a true positive decline or a false positive decline is further based on at least one report associated with a merchant involved in the declined transaction.

5. The computer-implemented method of claim 1, wherein calculating whether the declined transaction is a true positive decline or a false positive decline is further based on at least one report associated with a geographic region of a merchant involved in the declined transaction.

6. The computer-implemented method of claim 1, wherein one or more of the multiple rules are based on a number of transactions directed to the payment account after the declined transaction and a defined time interval.

7. The computer-implemented method of claim 1, wherein appending the fraud accuracy tag to the declined transaction in the data structure associated with at least one of the payment network and the issuer includes appending the fraud accuracy tag in addition to a fraud determination indicator for the declined transaction in the data structure associated with at least one of the payment network and the issuer.

8. A system for using a research engine computing device, to employ payment account transaction data as a basis to append fraud accuracy tags to declined transactions, the system comprising:

a memory comprising a data structure, the memory included in a payment network, the data structure including multiple transactions each associated with a payment account of an issuer, a subset of the multiple transactions being declined transactions; and a research engine computing device coupled in communication with the memory, the research engine computing device integrated with the payment network and configured to:

for each of the declined transactions in the subset of the multiple transactions:

retrieve transaction data for the payment account to which the declined transaction is directed, the declined transaction accessed by the research engine computing device offline after the transaction was originally declined;

retrieve transaction data for a merchant involved in the declined transaction;

calculate, based on at least one fraud analysis rule and the transaction data for the payment account, whether the declined transaction is a true positive decline or a false positive decline, the at least one fraud analysis rule accessed from a rules data structure stored in the memory;

calculate, based on at least one other fraud analysis rule and the transaction data for the merchant, whether the declined transaction is a true positive decline or a false positive decline; and append a fraud accuracy tag to the declined transaction in the data structure associated with the payment network, wherein the fraud accuracy tag is indicative of the calculated true positive decline(s) or the calculated false positive decline(s) based on the at least one fraud analysis rule and/or the at least one other fraud analysis rule;

calculate a fraud detection metric based on the fraud accuracy tags for the declined transactions, whereby the fraud detection metric is indicative of overall performance of a fraud strategy; and transmit the fraud detection metric to the issuer of the payment accounts associated with the declined transactions, thereby permitting the issuer to evaluate accuracy of the fraud strategy.

9. The system of claim 8, wherein the research engine computing device is configured to calculate the fraud detection metric further based on a different subset of the multiple transactions for which fraud accuracy tags are not appended.

10. The system of claim 8, wherein the fraud detection metric includes one or more of a client impact ratio, a decision effectiveness rating, a decline fraud rate, a monetary impact rate, and an impact recovery rate.

11. The system of claim 8, wherein the research engine computing device is further configured to, for each of the declined transactions, calculate, based on at least one further fraud analysis rule and reporting associated with the merchant involved in the declined transaction, whether the declined transaction is a true positive decline or a false positive decline; and wherein the fraud accuracy tag is indicative of the calculated true positive decline(s) or the determined false positive decline(s) based on the at least one fraud analysis rule, the at least one other fraud analysis rule, and/or the at least one further fraud analysis rule.

12. A non-transitory computer readable storage media including computer executable instructions for analyzing declined payment account transactions that, when executed by a processor, cause the processor to:

for each of multiple declined transactions:

retrieve, by a research engine integrated with at least one of a payment network and an issuer, the transaction included in a data structure as a declined transaction, the transaction associated with a payment account associated with the issuer and a merchant, the data structure associated with at least one of the payment network and the issuer, the declined transaction accessed by the research engine offline after the transaction was originally declined;

retrieve transaction data for the payment account;

calculate, based on the transaction data for the payment account, whether approval activity for the payment account halted after the declined transaction; and append a fraud accuracy tag to the declined transaction in the data structure associated with the at least one of the payment network and the issuer, the fraud accuracy tag indicating a true positive fraud decline when the approval activity for the payment account halted after the declined transaction, thereby permitting one or more fraud strategies involved in declining the transaction to be evaluated for accuracy;

calculate at least one fraud detection metric based on the fraud accuracy tags appended to each of the multiple declined transactions, whereby the at least one fraud detection metric is indicative of overall performance of the one or more fraud strategies; and transmit the at least one fraud detection metric to the issuer associated with the payment account, thereby permitting the issuer to evaluate accuracy of the fraud strategy.

13. The non-transitory computer readable storage media of claim 12, wherein the computer executable instructions, when executed by the processor, further cause the processor to determine a clearing rate associated with the merchant; and wherein the fraud accuracy tag indicates the true positive fraud decline further when the clearing rate associated with the merchant is zero.

\* \* \* \* \*